United States Patent
Sun

(10) Patent No.: US 11,632,852 B2
(45) Date of Patent: *Apr. 18, 2023

(54) DOWNHOLE NEUTRON GENERATORS AND METHODS TO AUTO TUNE DOWNHOLE NEUTRON GENERATORS

(71) Applicant: Halliburton Energy Services, Inc., Houston, TX (US)

(72) Inventor: Wei Sun, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,917

(22) Filed: Jun. 15, 2022

(65) Prior Publication Data

US 2022/0312577 A1    Sep. 29, 2022

Related U.S. Application Data

(63) Continuation of application No. 16/605,427, filed as application No. PCT/US2019/014280 on Jan. 18, 2019, now Pat. No. 11,395,399.

(51) Int. Cl.
| | |
|---|---|
| *H05H 3/04* | (2006.01) |
| *H05H 3/06* | (2006.01) |
| *E21B 49/00* | (2006.01) |
| *E21B 44/00* | (2006.01) |
| *E21B 47/14* | (2006.01) |

(Continued)

(52) U.S. Cl.
CPC ............... *H05H 3/04* (2013.01); *E21B 28/00* (2013.01); *E21B 44/00* (2013.01); *E21B 47/14* (2013.01); *E21B 49/00* (2013.01); *H05H 3/06* (2013.01); *G01V 5/10* (2013.01)

(58) Field of Classification Search
CPC .......... E21B 28/00; E21B 44/00; E21B 47/14; E21B 49/00; G01V 5/10; H05H 3/04; H05H 3/06

See application file for complete search history.

(56) References Cited

U.S. PATENT DOCUMENTS

| | | | |
|---|---|---|---|
| 4,288,696 A | 9/1981 | Peelman et al. | |
| 8,594,265 B2 | 11/2013 | Perkins et al. | |

(Continued)

OTHER PUBLICATIONS

International Search Report and Written Opinion dated Oct. 23, 2019; International PCT Application No. PCT/US2019/014280.

*Primary Examiner* — Mark R Gaworecki
(74) *Attorney, Agent, or Firm* — Barnes & Thornburg, LLP

(57) ABSTRACT

Downhole neutron generators, downhole logging tools that utilize neutron generators, and methods to auto tune downhole neutron generators are disclosed. While a neutron generator is deployed in a borehole of a wellbore, the method includes determining whether an oscillation cycle of an ion beam current generated by the neutron generator is stable. After a determination that the oscillation cycle of the ion beam current is stable, the method includes determining proportional, integral, and derivative parameters of a proportional-integral-derivative controller that is operable to adjust an amount of power supplied to generate ions. The method further includes adjusting a replenish voltage of a replenish power supply of the neutron generator based on the proportional, integral, and derivative parameters.

20 Claims, 7 Drawing Sheets

(51) Int. Cl.
  *E21B 28/00* (2006.01)
  *G01V 5/10* (2006.01)

(56) References Cited

U.S. PATENT DOCUMENTS

| | | |
|---|---|---|
| 11,395,399 B2 * | 7/2022 | Sun .................. E21B 28/00 |
| 2009/0219028 A1 | 9/2009 | Perkins et al. |
| 2016/0320520 A1 | 11/2016 | Hiles et al. |
| 2018/0188409 A1 | 7/2018 | Manclossi et al. |
| 2018/0246249 A1 | 8/2018 | Navarro-Sorroche et al. |
| 2018/0255632 A1 | 9/2018 | Navarro-Sorroche et al. |

* cited by examiner

DOWNHOLE NEUTRON GENERATORS AND METHODS TO AUTO TUNE DOWNHOLE NEUTRON GENERATORS

CROSS-REFERENCE TO RELATED APPLICATIONS

This application is a Continuation of U.S. application Ser. No. 16/605,427 filed Oct. 15, 2019, which is an U.S. National Stage of PCT Application No. PCT/US2019/014280 filed Jan. 18, 2019, the disclosures of which are incorporated by reference herein in their entirety.

BACKGROUND

The present disclosure relates generally to downhole neutron generators, downhole logging tools that utilize neutron generators, and methods to auto tune downhole neutron generators.

Oil and gas companies often utilize different logging techniques to obtain a record of petrophysical properties of a formation, such as, but not limited to, formation resistivity, formation anisotropy, dip angle of formation bed, radioactivity of the formation, formation density, formation porosity, acoustic properties of the formation, and formation pressure properties as well as other properties of the formation (collectively referred to as "formation properties"). For example, in wireline logging, a logging tool is attached to a wireline and is lowered into a borehole. The logging tool contains various sensor components used to obtain the formation properties. Data corresponding to the measurements may be recorded in real time mode or in memory mode.

Some logging tools utilize neutron generators to generate neutrons that interact with the surrounding formation and utilize sensors to detect resulting signals indicative of the formation properties of the surrounding formation. Neutron generators are sometimes tuned in a laboratory environment to generate desirable reactions based on predicted downhole environments. More particularly, parameters of certain controllers of a neutron generator, such as proportional, integral, and derivative parameters of a proportional-integral-derivative (PID) controller, which is utilized by the neutron generator to adjust the amount of power supplied to initiate a desirable reaction, are predetermined and set before deployment of the neutron generator. However, actual downhole environments often vary, as such, the predetermined parameters may not generate desirable reactions in the actual downhole environment. Further, the downhole environment may change after deployment of the neutron generator. As such, even if the neutron generator is tuned for deployment in the downhole environment, a change in the downhole environment may cause the downhole generator to no longer generate reactions suitable in the new downhole environment.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 1A is stabilized;

FIG. 1A is stabilized;

Figure 1A:
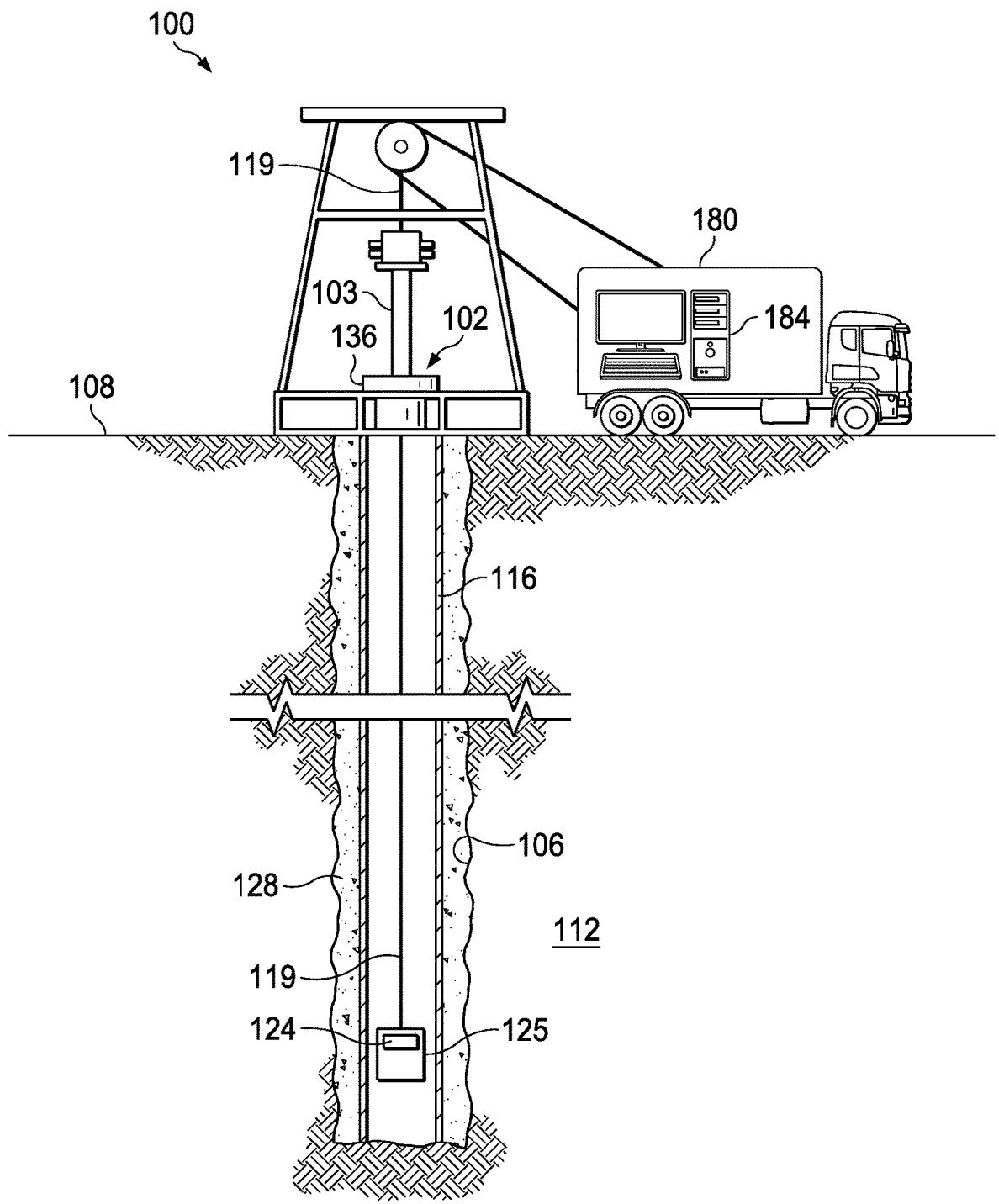
FIG. 1A illustrates a schematic view of a wireline logging environment in which a downhole neutron generator is deployed on a wireline in an annulus of a casing.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to downhole neutron generators, downhole logging tools that utilize neutron generators, and methods to auto tune downhole neutron generators. In some embodiments, a downhole neutron generator includes a gas reservoir, a reservoir control supply, an ion source, an ion acceleration tube, a target foil, and a power supply that is electrically coupled to the target foil. As referred to herein, a reservoir is an element or component that releases ionizable gas when the reservoir is heated to a threshold temperature. In some embodiments, the reservoir contains a filament (e.g., a tungsten filament) having a coat of material (e.g., zirconium) that releases hydrogen isotopes when the filament is heated, where the amount of hydrogen isotopes released over a unit of time (e.g., second, millisecond, or another unit of time) is based on the temperature of the filament. The downhole generator also includes a reservoir control supply that is electrically coupled to the filament and operable to supply a range of voltages to initiate neutron generation. As referred to herein, a reservoir control supply is any power supply that is electrically coupled to the reservoir (e.g., filament) and operable to supply a range of voltages to heat up the reservoir to a range of temperatures to release a desirable amount of hydrogen isotopes. In some embodiments, a neutron generation process is controlled by regulating the voltage of the reservoir control supply.

After the hydrogen isotopes are released, the ion source is actuated to ionize the hydrogen isotopes. A power supply that is electrically connected to the target foil applies an ion beam current to the target foil to generate an electric field in and around the acceleration tube. The generated electric field causes the ions to accelerate through the acceleration tube into the target foil to generate neutrons used for well logging.

The neutron generator also includes one or more processors that control the amount of voltage supplied by the reservoir control supply while the ion beam current is stabilizing. As referred to herein, the ion beam current is stable if the ion beam current oscillates between a desired measurement of current plus a buffer amount (hereafter referred to as the "first value") and a desired measurement of current minus the buffer amount (hereafter referred to as the "second value") for a threshold number of oscillations (e.g., 2 oscillations, 10 oscillations, or another number of oscillations). Additional descriptions of operations performed by the one or more processors to control the voltage supplied to the reservoir control supply until the ion beam current has a stable oscillation cycle are provided in the paragraphs below and are illustrated in at least FIGS. 3A and 3B.

After the ion beam current has a stable oscillation cycle, the one or more processors determine the difference between the desired measurement of the ion beam current and the actual measurement of the ion beam current (the foregoing difference is hereafter referred to as the "current error"). The one or more processors also determine proportional, integral, and derivative parameters of a proportional-integral-derivative (PID) controller. As referred to herein, the PID controller is a logic and/or physical component of the downhole neutron generator that adjusts the amount of power supplied to generate ions. In some embodiments, the PID controller is a logical component of the one or more processors. The one or more processors then determine a manipulated variable, which is equal to a value of a new voltage of the reservoir control supply, based on the current error value and the proportional, integral, and derivative parameters. The one or more processors then adjust the voltage of the reservoir control supply to equal to the manipulated variable to generate a stable and desired amount of neutrons for well logging. Additional details of the downhole neutron generators and downhole logging tools that utilize neutron generators are provided in the paragraphs below.

Now turning to the figures, FIG. 1A illustrates a schematic view of a wireline logging environment 100 in which a downhole neutron generator 124 is deployed on a wireline 119 in a wellbore 106. Additional discussions of various components of downhole neutron generator 124 are provided in the paragraphs below and are illustrated in at least FIGS. 2A and 2B.

In the embodiment of FIG. 1A, a well having wellbore 106 extends from a surface 108 of the well 102 to or through a subterranean formation 112. A casing 116 is deployed along wellbore 106 to insulate downhole tools and strings deployed in casing 116, to provide a path for hydrocarbon resources flowing from subterranean formation 112, to prevent cave-ins, and/or to prevent contamination of subterranean formation 112. Casing 116 is normally surrounded by a cement sheath 128, which is deposited in an annulus between the casing 116 and wellbore 106 to fixedly secure casing 116 to the wellbore 106 and to form a barrier that isolates casing 116. Although not depicted, there may be layers of casing concentrically placed in wellbore 106, each having a layer of cement or the like deposited thereabout.

A vehicle 180 carrying controller 184 and wireline 119 is positioned proximate to the well 102. Wireline 119, along with downhole neutron generator 124 and a logging tool 125 are lowered through the blowout preventer 103 into the well 102. Data indicative of measurements obtained by logging tool 125 may be transmitted via wireline 119 or via another telemetry system to surface 108 for processing by controller 184 or by another electronic device operable to process data obtained by logging tool 125. Controller 184 may include any electronic and/or optoelectronic device operable to receive data and/or process data indicative of one or more formation properties to determine the formation properties. In the embodiment of FIG. 1A, controller 184 is stored on vehicle 180. In some embodiments, controller 184 may also be housed in a temporary and/or permanent facility (not shown) proximate to the well 102. In other embodiments, the controller 184 may also be deployed at a remote location relative to the well 102. Additional operations of controller 184 are provided in the paragraphs below. In some embodiments, controller 184 includes a storage medium containing instructions for auto tuning downhole neutron generator 124 and for determining proportional, integral, and derivate parameters of a PID controller of downhole neutron generator 124. In one or more of such embodiments, controller 184, after determining the proportional, integral, and derivate parameters of the PID controller, transmits the determined values of the proportional, integral, and derivate parameters via telemetry downhole to downhole neutron generator 124. Additional descriptions of operations performed to generate determining proportional, integral parameters and to auto tune downhole neutron generator 124 are provided in the paragraphs below.

Figure 1B:
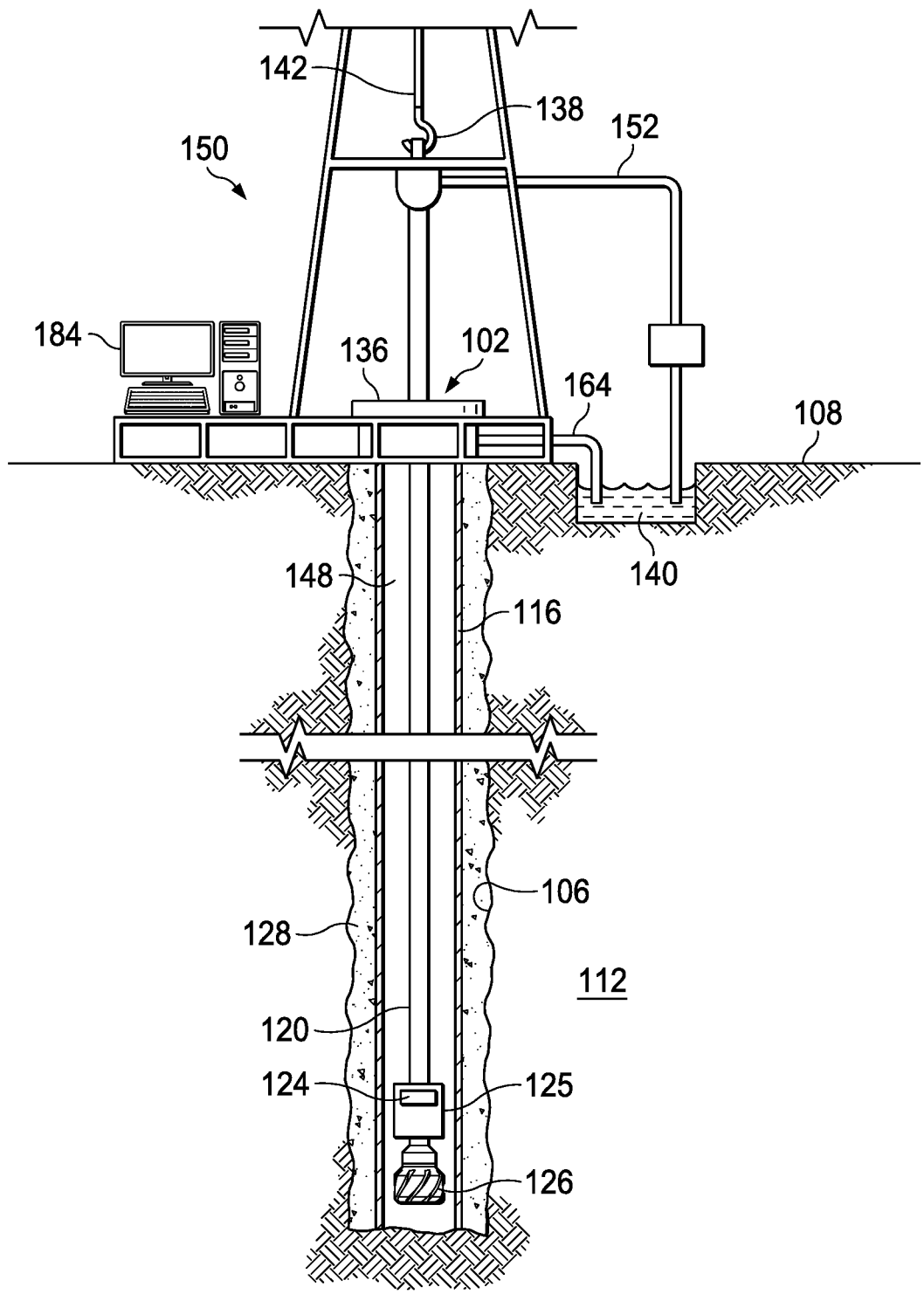
FIG. 1B illustrates a schematic view of a logging while drilling environment in which the downhole neutron generator of FIG. 1A is deployed in an annulus of the casing.

FIG. 1B is a schematic, side view of a logging while drilling (LWD) environment 150 in which downhole neutron generator 124 of FIG. 1A is deployed in wellbore 106 to detect leaks long wellbore 106. In the embodiment of FIG. 1B, a hook 138, cable 142, traveling block (not shown), and hoist (not shown) are provided to lower a tool string 120 down the wellbore 106 or to lift the tool string 120 up from wellbore 106. Tool string 120 may be a drill string or another type of tool string operable to deploy downhole neutron generator 124. At wellhead 136, an inlet conduit 152 is coupled to a fluid source (not shown) to provide fluids, such as drilling fluids, downhole. Tool string 120 has an internal annulus that provides a fluid flow path from surface 108 down to drill bit 126. Tool string 120 is coupled to downhole neutron generator 124 and logging tool 125. The fluids travel down tool string 120 and exit tool string 120 at drill bit 126. The fluids flow back towards surface 108 through a wellbore annulus 148 and exit the wellbore annulus 148 via an outlet conduit 164 where the fluids are captured in a container 140.

Once downhole neutron generator 124 is lowered to a desired location, the voltage of the reservoir control supply is adjusted until the ion beam current has a stable oscillation cycle. After the ion beam current has a stable oscillation cycle, downhole neutron generator 124 determines the current error value, and the proportional, integral, and derivative parameters. Downhole neutron generator 124 then determines a manipulated variable based on the error value and the proportional, integral, and derivative parameters, and adjusts the voltage of the reservoir control supply to equal the manipulated variable to generate a stable and desired amount of neutrons for well logging. Additional operations performed by downhole neutron generator 124 are provided in the paragraphs below and are illustrated in at least FIGS. 2A-2B and 3A-3B.

After adjusting the voltage of the reservoir control supply to initiate fusion reactions suitable for the downhole environment, downhole neutron generator 124 generates neutrons used for well logging. In the illustrated embodiments of FIGS. 1A and 1B, the generated neutrons traverse surrounding subterranean formation 112. In the illustrated embodiments of FIGS. 1A and 1B, logging tool 125 is operable to measure return signals indicative of the formation properties. In some embodiments, data indicative of the measured formation properties is stored in a local storage medium that is deployed at a downhole location proximate to downhole neutron generator 124. In other embodiments, the data is transmitted along wireline 119 of FIG. 1A uphole, where the data is analyzed by controller 184. Although FIGS. 1A and 1B illustrate downhole neutron generator 124 deployed in two exemplary environments, downhole neutron generator 124 may be deployed in various drilling, completion, and production environments. Further, although the FIGS. 1A and 1B illustrate downhole neutron generator 124 as a component of logging tool 125, in some embodiments, downhole neutron generator 124 and logging tool 125 are separate devices.

Figure 2A:
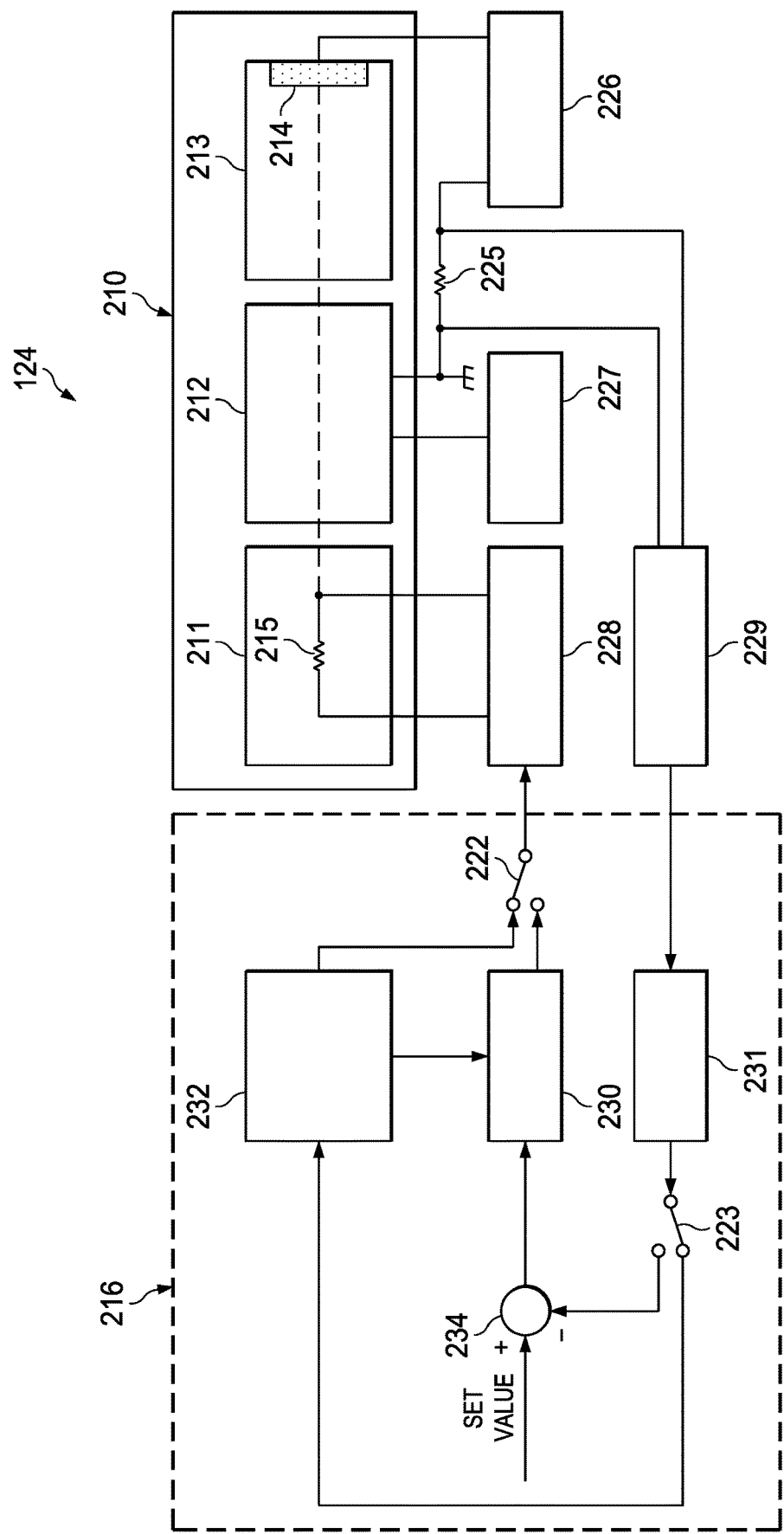
FIG. 2A illustrates a schematic view of the downhole neutron generator of FIG. 1A before an oscillation cycle of an ion beam current generated by the downhole neutron generator

FIG. 2A illustrates a block view of downhole neutron generator 124 of FIG. 1A before an oscillation cycle of an ion beam current generated by downhole neutron generator 124 of FIG. 1A is stabilized. In the illustrated embodiment of FIG. 2A, downhole neutron generator 124 includes a neutron generator tube 210 and a processor 216.

Neutron generator tube 210 includes a gas reservoir 211 having a filament 215, an ion source 212, an acceleration tube 213, and a target foil 214. Filament 215 is coated with a material (e.g., zirconium) that releases hydrogen isotopes when heated to a threshold temperature. Further, filament 215 is electrically coupled to a reservoir control supply 228 that provides a range of voltages to gas reservoir 211 and filament 215 to control the amount of hydrogen isotopes released by reservoir 211/filament 215. Ion source 212 is electrically coupled to an ion power supply 227, and when actuated, ionizes hydrogen isotopes released by gas reservoir 211/filament 215. Target foil 214 is deposited proximate an end of acceleration tube 213, and is electrically coupled to a power supply 226, which generates an electric field in and around acceleration tube 213. The generated electric field accelerates ions through acceleration tube 213 into target foil 214 to initiate fusion reactions and generation of neutrons. An ammeter 229 measures the ion beam current through a resistor 225 to determine the value of the ion beam current and whether the oscillations of the ion beam current is stable.

Components within dashed lines of processor 216 illustrate logical components of processor 216. In the illustrated embodiment of FIG. 2A, processor 216 includes a PID controller 230, a digital filter 231, an auto-tuning controller 232, and an error controller 234. Digital filter 231 filters noise and other undesirable components of the measurement of the ion beam current made by ammeter 229. Auto-tuning controller 232 adjusts the voltage of reservoir control supply 228 until the ion beam current has a stabile oscillation. In one or more embodiments, auto-tuning controller 232 utilizes relay feedback tests of the ion bream current between a desired current plus hysteresis (buffer current) and the desired current minus the buffer current to obtain the critical gain and critical frequency of downhole neutron generator 124 in the deployed environment. In some embodiments, the buffer current has a predetermined value. In some embodiments, the value of the buffer current is based on the amount of noise experienced by downhole neutron generator 124 or the amount of noise in the environment which downhole neutron generator 124 is deployed in. In one or more of such embodiments, the value of the buffer current is greater than the root-mean-square value of the system noise (experienced by downhole neutron generator 124) to provide a sufficient signal to noise ratio. In one or more embodiments, the system noise is predetermined or dynamically measured while downhole neutron generator 124 is deployed.

Figure 3A:
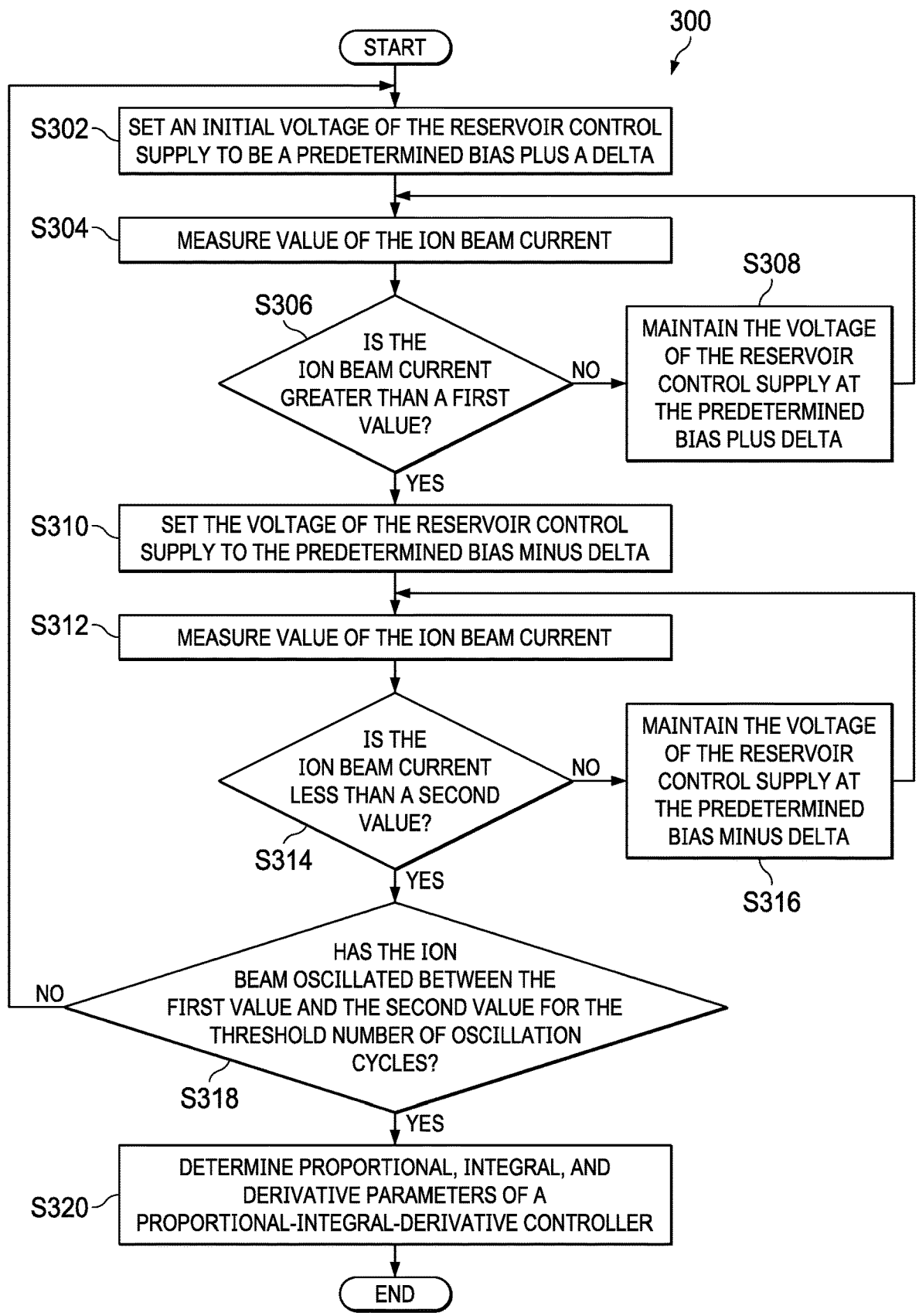
FIG. 3A illustrates a flow chart of a process to determine proportion, integral, and derivative parameters of the PID controller of the downhole neutron generator of FIG. 1A.
Figure 3B:
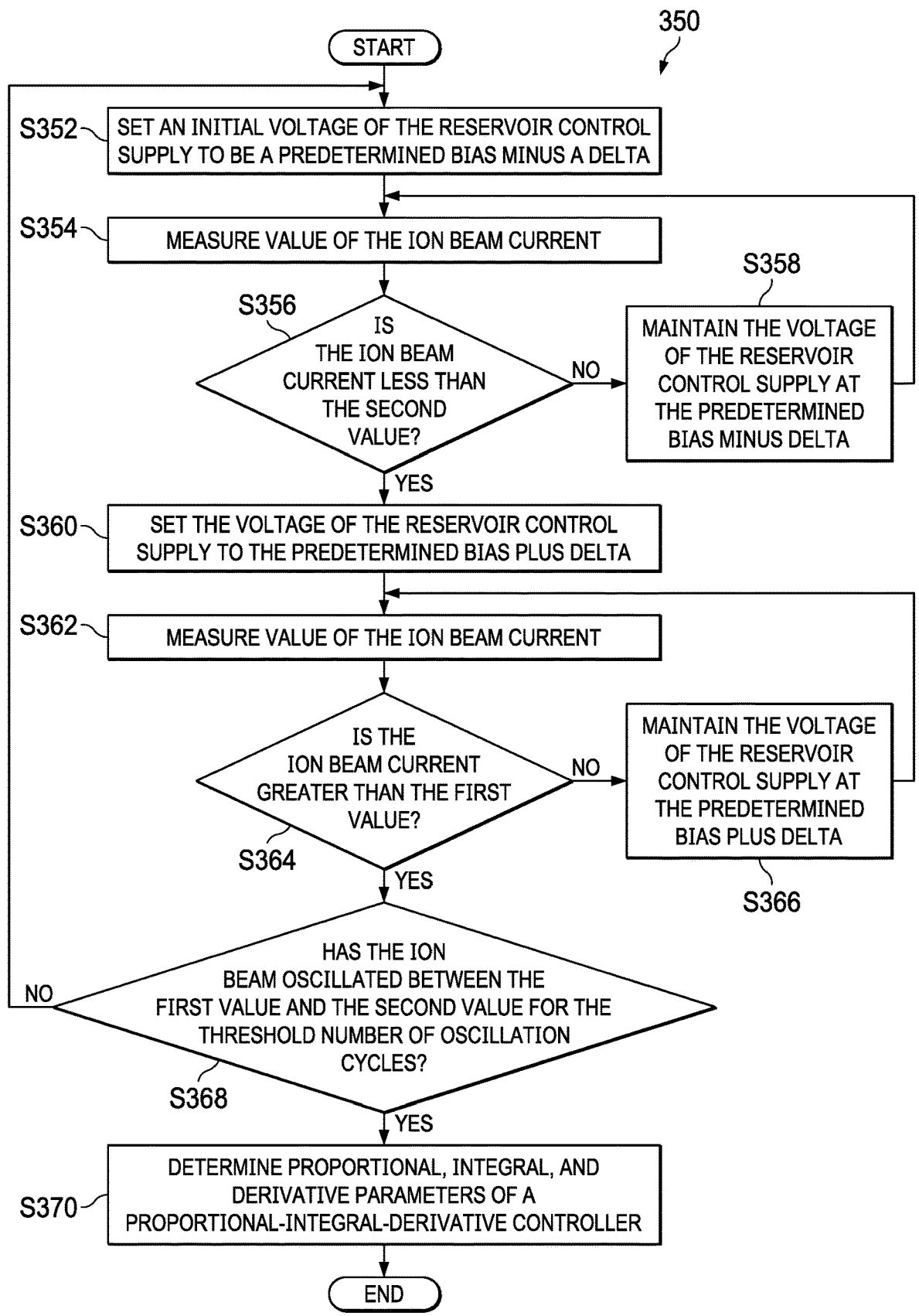
FIG. 3B illustrates a flow chart of another process to determine proportion, integral, and derivative parameters of the PID controller of the downhole neutron generator of FIG. 1A.

Processor 216 then calculates proportional, integral, and derivative parameters based on the determined critical gain and the critical frequency. Additional descriptions and illustrations of operations performed by auto-tuning controller 232 and processor 216 to determine proportional, integral, and derivative parameters, and to adjust the voltage of reservoir supply controller are provided in the paragraphs below and are illustrated in FIGS. 3A and 3B. Error controller 234 is operable of calculating the current error. PID controller 230 is a control loop feedback mechanism that utilizes three control parameters of proportional, integral, and derivative to apply an accurate and responsive correction to the voltage of the reservoir control supply to control the ion beam current.

In the illustrated embodiment of FIG. 2A, relays 222 and 223 connect auto-tuning controller 232 to reservoir control supply 228 and digital filter 231, respectfully. While relay 222 connects auto-tuning controller 232 to reservoir control supply 228, voltage of reservoir control supply 228 is controlled by auto-tuning controller 232. Moreover, measurements of the ion beam current made by ammeter 229 bypass PID controller 230 and the error controller 234, and are sent directly to auto-tuning controller 232. Auto-tuning controller 232 adjusts the voltage of reservoir control supply 228 between a predetermined bias plus a delta and the predetermined bias minus a delta, where delta is the amplitude of the voltage of reservoir control supply 228.

Figure 2B:
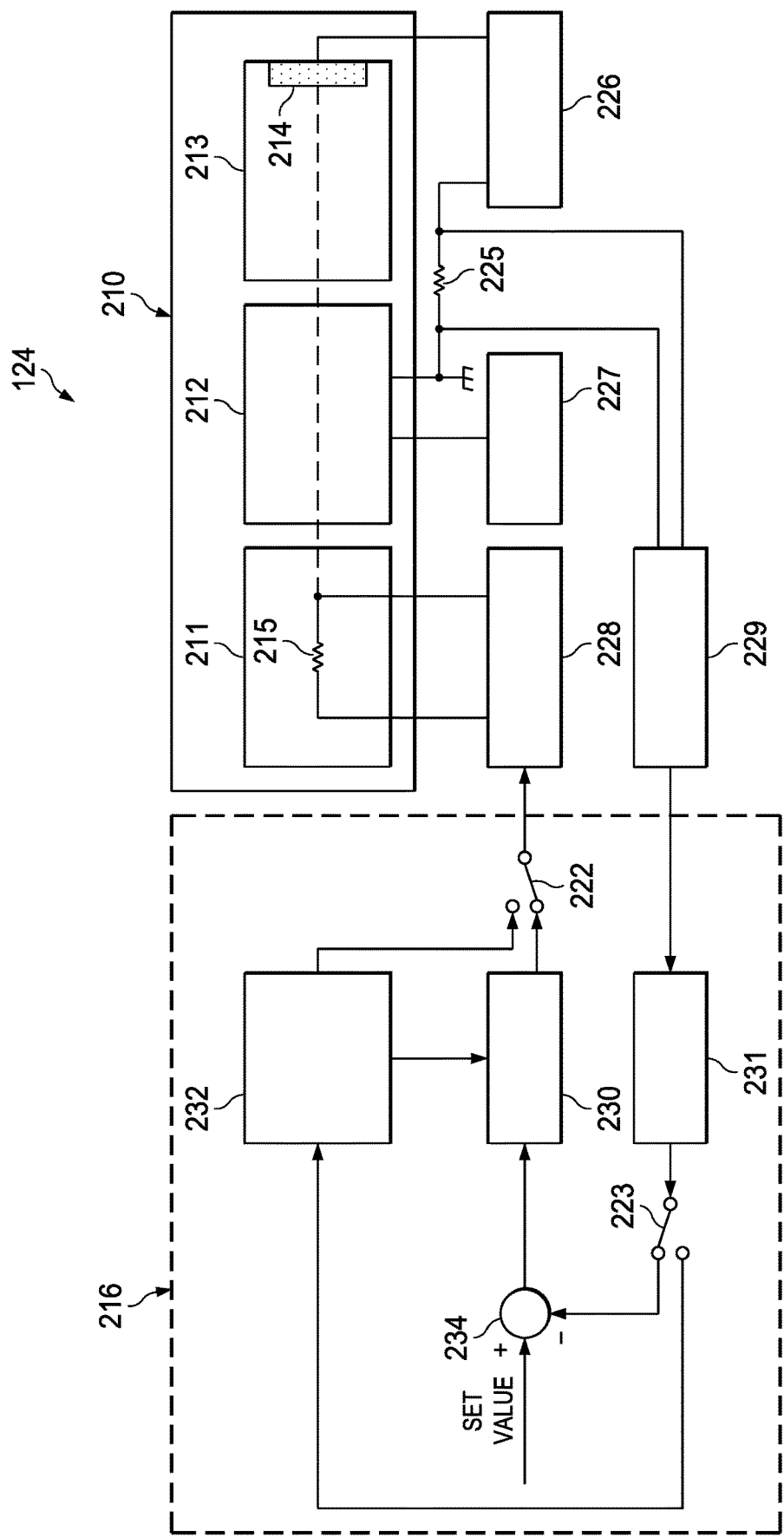
FIG. 2B illustrates a schematic view of the downhole neutron generator of FIG. 1A after an oscillation cycle of an ion beam current generated by the downhole neutron generator

FIG. 2B illustrates a block view of downhole neutron generator 124 of FIG. 1A after an oscillation cycle of an ion beam current generated by downhole neutron generator 124 FIG. 1A is stabilized. Relay 222 connects reservoir control supply 228 to PID controller 230, and relay 223 connects digital filter 231 to error controller 234. In the illustrated embodiment of FIG. 2B, the voltage of reservoir control supply 228 is controlled by PID controller 230. Further, the ion beam current through resister 225 is measured by ammeter 229 and is provided to error controller 234 to determine the error current.

Processor 216 determines the critical gain of the ion beam current, where the critical gain is determined by solving the following:

$$K_u = \frac{4*\Delta}{\pi*\sqrt{\alpha^2 - \epsilon^2}} \qquad \text{EQ. 1}$$

where $K_u$ is the critical gain, $\Delta$ is the amplitude of the voltage of reservoir control supply 228, $\alpha$ is the amplitude of the ion current beam, and $\epsilon$ is the buffer current. In some embodiments, processor 216 applies the Zigler-Nichols close-loop method to determine P, I, and D parameters by solving the following:

$$K_p = 0.6*K_u \qquad \text{EQ. 2}$$

$$T_i = 0.5*P_u \qquad \text{EQ. 3}$$

$$T_d = 0.125*P_u \qquad \text{EQ. 4}$$

where $K_p$ is the proportional parameter, $T_i$ is the interval parameter, and $T_d$ is the derivative parameter, and $P_u$ is the critical period of the ion beam. In some embodiments, the criterial period $P_u$ is determined from oscillation data obtained during auto-tuning.

Processor 216, after determining the proportional, integral, and derivative parameters of PID controller 230, determines a value of the reservoir control supply 228 to generate the desired amount of neutron in the downhole environment by solving:

$$MV = K_p * e(t) + K_i * \int_0^t e(t') * dt' + k_d * \frac{de(t)}{dt} \qquad \text{EQ. 5}$$

where MV is the value of the reservoir control supply 228, e(t) is the current error, $K_p$ is the proportional parameter, $K_i$ is the interval parameter, and $K_d$ is the derivative parameter. PID controller 230, then sets the voltage of reservoir control supply 228 to the determined value of MV. In some embodiments, PID controller 230 solves EQ. 5 to determine the value of MV and automatically adjusts the voltage of reservoir control supply 228 to match the determined value of MV. In some embodiments, ammeter 229 periodically or continuously measures the ion beam current during the neutron generation process and periodically or continuously provides the measured ion beam current to error controller 234. In one or more of such embodiments, error controller 234 determines the current error and provides the determined current error to PID controller 230. PID controller 230 then recalculates MV based on the updated value of the current error and adjusts the voltage of reservoir control supply 228 to match the recalculated value of MV.

In some embodiments, where the downhole environment the downhole neutron generator 124 is deployed in changes, or after a threshold period of time, downhole neutron generator 124 performs another auto-tuning operation described and illustrated in FIGS. 2A and 3A or 3B and recalculates proportional, integral, and derivative parameters. In some embodiments, certain components of downhole neutron generator 124 are deployed on surface 108. In one or more embodiments, auto-tuning controller 232 is deployed on surface 108 and is communicatively connected to PID controller 230 via telemetry, such as wireline 119 of FIG. 1A. Although FIGS. 2A and 2B illustrate multiple logical components of processor 216, in some embodiments, a single logical component performs the operations described herein to determine the current error, auto-tune the voltage of reservoir control supply 228, determine proportional, integral, and derivate parameters, and/or filter noise associated with the ion beam current. In some embodiments, one or more logical components shown in FIGS. 2A and 2B are also physical components. In one or more of such embodiments digital filter 231 is physical band pass filter component of downhole neutron generator 124. Further, although FIGS. 2A and 2B illustrate reservoir control supply 228, ion power supply 227, and power supply 226 as separate power supplies, in some embodiments, a single power supply or a different number of power supplies are electrically coupled to reservoir 211/filament 215, ion source 212, and target foil 214 of FIGS. 2A and 2B.

FIG. 3A illustrates a flow chart of a process 300 to determine proportion, integral, and derivative parameters of the PID controller of downhole neutron generator 124 of FIG. 1A. Although operations in the process 300 are shown in a particular sequence, certain operations may be performed in different sequences or at the same time where feasible. Further, although the operations in the process 300 are described to be performed by processor 216 of FIG. 2A, the operations may also be performed by other processors of other downhole or surface-based tools or devices. At block S302, processor 216 sets an initial voltage of the reservoir control supply to be a predetermined bias plus a delta. At block S304, processor 216 measures the value of the ion beam current. At block S306, processor 216 determines whether the ion beam current is greater than a desired current plus a buffer (first value). At block S308, if processor 216 determines that the value of the ion beam current is not greater than the first value, processor 216 maintains the voltage of the reservoir control supply at the predetermined bias plus delta. The process then returns to block S304. Alternatively, if at block S306, processor 216 determines that the value of the ion beam current is greater than the first value, then the process proceeds to block S310.

At block S310, processor 216 of FIG. 2A sets the voltage of the reservoir control supply to the predetermined bias minus delta. At block S312, processor 216 measures (or determines) the value of the ion beam current. At block S314, processor 216 determines if the ion beam current is less than the value of the desired current minus the buffer (second value). At block S316, processor 216, in response to determining that the ion beam current is not less than the second value, maintains the voltage of the reservoir control supply at the predetermined bias minus delta. The process then proceeds to block S312. Alternatively, if processor 216 at block S314 determines that the ion beam current is less than the second value, the process proceeds to block S318.

At block S318, processor 216 of FIG. 2A determines if the ion beam has oscillated between the first value and the second value for the threshold number of oscillation cycles. If processor 216 determines that the ion beam has not oscillated between the first value and the second value for the threshold number of oscillation cycles, the process returns to block S302. Alternatively, if processor 216, at block S318 determines that the ion beam has oscillated between the first value and the second value for the threshold number of times, the process proceeds to block S320. At block S320, processor 216 determines proportion, integral, and derivative parameters of the proportional-integral-derivative controller of downhole neutron generator 214 of FIG. 1A.

FIG. 3B illustrates a flow chart of another process 350 to determine proportion, integral, and derivative parameters of the PID controller of downhole neutron generator 124 of FIG. 1A. Although operations in the process 350 are shown in a particular sequence, certain operations may be performed in different sequences or at the same time where feasible. Further, although the operations in the process 350 are described to be performed by processor 216 of FIG. 2A, the operations may also be performed by other processors of other downhole or surface-based tools or devices. At block S352, processor 216 sets an initial voltage of the reservoir control supply to be a predetermined bias minus a delta. At block S354, processor 216 measures the value of the ion beam current. At block S356, processor 216 determines whether the ion beam current is less than the second value. At block S358, if processor 216 determines that the value of the ion beam current is not less than the second value, processor 216 maintains the voltage of the reservoir control supply at the predetermined bias minus delta. The process then returns to block S354. Alternatively, if at block S356, processor 216 determines that the value of the ion beam current is less than the second value, then the process proceeds to block S360.

At block S360, processor 216 of FIG. 2A sets the voltage of the reservoir control supply to the predetermined bias plus delta. At block S362, processor 216 measures (or determines) the value of the ion beam current. At block S364, processor 216 determines if the ion beam current is greater than the first value. At block S366, processor 216, in response to determining that the ion beam current is not greater than the first value, maintains the voltage of the reservoir control supply at the predetermined bias plus delta. The process then proceeds to block S362. Alternatively, if processor 216 at block S364 determines that the ion beam current is greater than the first value, the process proceeds to block S368.

At block S368, processor 216 of FIG. 2A determines if the ion beam has oscillated between the first value and the second value for the threshold number of oscillation cycles. If processor 216 determines that the ion beam has not oscillated between the first value and the second value for the threshold number of oscillation cycles, the process returns to block S352. Alternatively, if processor 216, at block S368 determines that the ion beam has oscillated between the first value and the second value for the threshold number of times, the process proceeds to block S370. At block S370, processor 216 determines proportion, integral, and derivative parameters of the proportional-integral-derivative controller of downhole neutron generator 214 of FIG. 1A.

Figure 4:
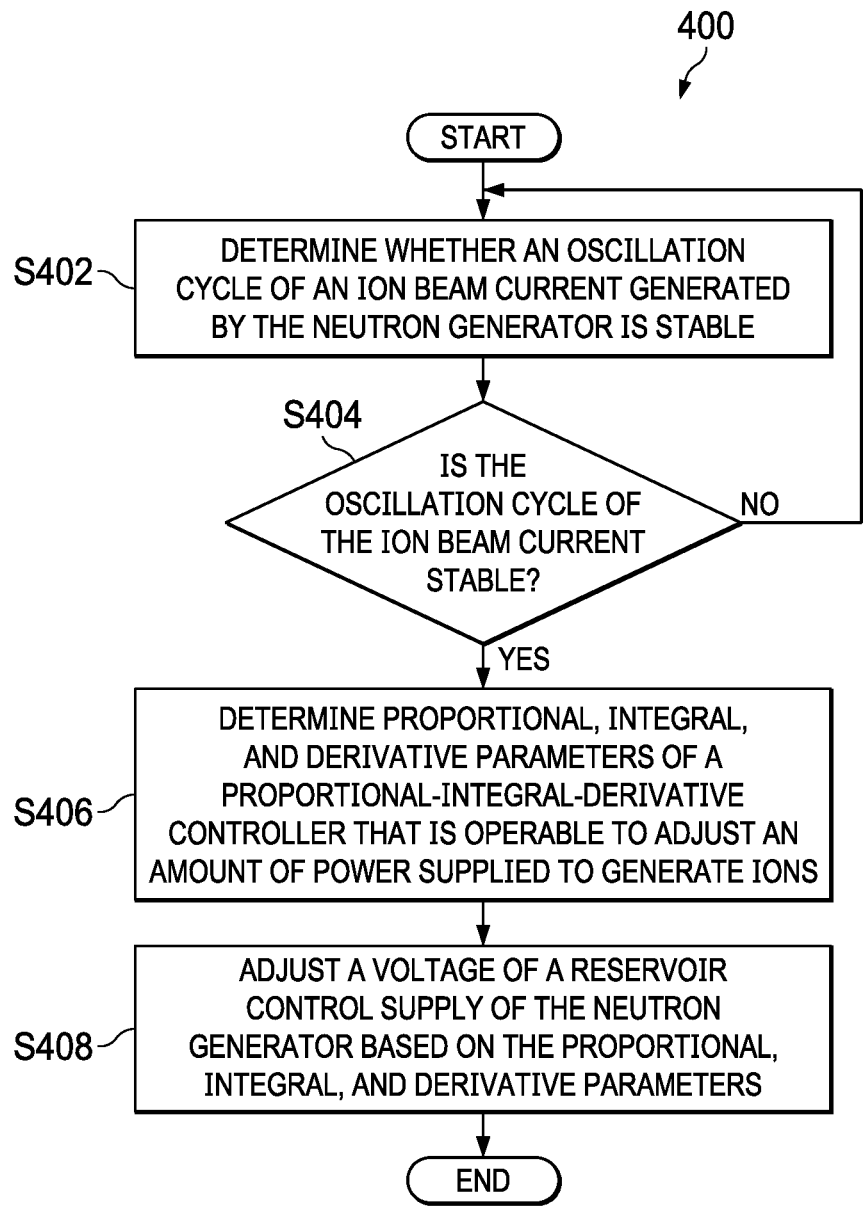
FIG. 4 illustrates a flow chart of a process to auto tune a neutron generator.

FIG. 4 illustrates a flow chart of a process 400 to auto tune a neutron generator. Although operations in the process 400 are shown in a particular sequence, certain operations may be performed in different sequences or at the same time where feasible. Further, although the operations in the process 400 are described to be performed by downhole neutron generator 124 of FIG. 1A, the operations may also be performed by other embodiments of a downhole neutron generator described herein.

At block S402, downhole neutron generator 124 determines whether an oscillation cycle of an ion beam current generated by downhole neutron generator 124 is stable. In the embodiments of FIGS. 2A and 2B, ammeter 229 measures the ion beam current through resister 225. In some embodiments, downhole neutron generator 124 filters the measured ion beam to remove noise components (e.g., system noise or noise from the surrounding environment). In the embodiments illustrated in FIGS. 2A and 2B, unwanted noise is filtered by digital filter 231. In some embodiments, the voltage of a power supply that is coupled to a reservoir/filament (e.g., reservoir 211/filament 215 of FIGS. 2A and 2B) is adjusted to control the ion beam current. In the embodiment of FIG. 2A, auto-tuning controller 232 initially adjusts the voltage of reservoir control supply 228 to control the ion beam current until the ion beam current has a stable oscillation cycle. FIGS. 3A and 3B, for example illustrate two processes 300 and 350 for determining whether the oscillation cycle of the ion beam current generated by downhole neutron generator 124 is stable.

At block S404, if downhole neutron generator 124 determines that the oscillation cycle of the ion beam current is not yet stable, the process returns to block S402. Alternatively, if downhole neutron generator determines at block S404 that the oscillation cycle of the ion beam current is stable, then the process proceeds to block S406. At block S406, downhole neutron generator 124, after determining that the ion beam current is stable, determines proportion, integral, and derivative parameters of the proportional-integral-derivative controller of downhole neutron generator 124. At block S408, downhole neutron generator 124 adjusts a voltage of the reservoir control supply based on the determined proportional, integral, and derivative parameters. In some embodiments, downhole neutron generator 124 solves equations 1-5 provided herein to determine the voltage of the reservoir control supply that would generate a desirable amount of neutrons for well logging as well as other types of operations performed by tool 125 of FIG. 1A.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a method to auto tune a downhole neutron generator, the method comprising: while a downhole neutron generator is deployed in a borehole of a wellbore, determining whether an oscillation cycle of an ion beam current generated by the downhole neutron generator is stable; after a determination that the oscillation cycle of the ion beam current is stable, determining proportional, integral, and derivative parameters of a proportional-integral-derivative controller that is operable to adjust an amount of power supplied to generate ions; and adjusting a voltage of a reservoir control supply of the downhole neutron generator based on the proportional, integral, and derivative parameters.

Clause 2, the method of clause 1, further comprising: periodically measuring the ion beam current, wherein determining whether the ion beam current has a stable oscillation cycle further comprises determining whether the ion beam current oscillates between a first value and a second value for a threshold number of oscillation cycles.

Clause 3, the method of clause 2, wherein the first value is equal to a value of a desired current plus a buffer, and the second value is equal to the value of the desired current minus the buffer.

Clause 4, the method of clause 3, wherein for each oscillation cycle of the threshold number of oscillation cycles, determining whether the ion beam current oscillates between the first value and the second value comprises setting an initial value of the voltage of the reservoir control supply to a predetermined bias plus a delta; while the value of the voltage is set at the predetermined bias plus delta: periodically determining if a value of the ion beam current is greater than the first value; in response to a determination that the value of the ion beam current is not greater than the first value, maintaining the value of the voltage at the predetermined bias plus delta; and in response to a determination that the value of the ion beam current is greater than the first value, setting the value of the voltage to the predetermined bias minus delta; and while the value of the voltage is set at the predetermined bias minus delta: periodically determining if the value of the ion beam current is less than the second value; and in response to a determination that the value of the ion beam current is not less than the second value, maintaining the value of the voltage at the predetermined bias minus delta; and in response to a determination that the value of the ion beam current is less than the second value and the ion beam current has not oscillated between the first value and the second value for the threshold number of oscillation cycles, setting the value of the voltage to the predetermined bias plus delta.

Clause 5, the method of clause 4, wherein while the value of the voltage is set at the predetermined bias minus delta, the method further comprises in response to a determination that the value of the ion beam current is less than the second value and the ion beam current has oscillated between the first value and the second value for the threshold number of oscillation cycles, determining the proportional, integral, and derivative parameters of a proportional-integral-derivative controller.

Clause 6, the method of any of clauses 1-5, further comprising configuring the proportional-integral-derivative controller based on the determined proportional, integral, and derivative parameters, wherein adjusting the voltage comprises utilizing the configured proportional-integral-derivative controller to adjust the voltage.

Clause 7, the method of any of clauses 1-6, wherein after determining that the oscillation cycle of the ion beam current is stable, the method further comprises calculating a difference between a desired current value and a measured value of the ion beam current; and adjusting the voltage based on the difference between the desired current value and the measured value of the ion beam current.

Clause 8, the method of any of clauses 1-7, wherein adjusting the voltage comprises: determining a variable, wherein a value of the variable is equal to $$K_p * e(t) + K_i * \int_0^t e' * dt' + K_d * \frac{de(t)}{dt},$$

wherein $K_p$ is a coefficient for the proportional parameter, $K_i$ is a coefficient for the integral parameter, $K_d$ is a coefficient for the derivative parameter, and e(t) is a difference between a desired current value and a measured value of the ion beam current, and wherein adjusting the voltage comprises adjusting a value of the voltage to the value of the variable.

Clause 9, the method of any of clauses 1-8, further comprising filtering out a noise component of the ion beam current.

Clause 10, a downhole neutron generator comprising: a downhole neutron generator tube comprising: a gas reservoir that releases hydrogen isotopes when the gas reservoir is heated; an ion source for ionizing the hydrogen isotopes; a target foil; an acceleration tube for accelerating ions of the hydrogen isotopes, wherein neutrons are generated when ions of the hydrogen isotopes are accelerated through the acceleration tube, and into the target foil; a reservoir control supply electrically connected to the filament and operable to supply a range of voltages to the filament to initiate neutron generation; and a processor operable to: adjust a voltage of the reservoir control supply until an ion beam current of the downhole neutron generator has a stable oscillation cycle; and after the ion beam current has a stable oscillation cycle, the processor is further operable to: determine proportional, integral, and derivative parameters of a proportional-integral-derivative controller that is operable to adjust an amount of power supplied to generate ions; and adjust the voltage of the reservoir control supply based on the proportional, integral, and derivative parameters.

Clause 11, the downhole neutron generator of clause 10, wherein the processor is further operable to: periodically measure the ion beam current; and determine whether the ion beam current oscillates between a first value and a second value for a threshold number of oscillation cycles, wherein the ion beam current has a stable oscillation cycle if the ion beam current oscillates between a first value and a second value for the threshold number of oscillation cycles.

Clause 12, the downhole neutron generator of clause 11, wherein the first value is equal to a value of a desired current plus a buffer, and the second value is equal to the value of the desired current minus the buffer.

Clause 13, the downhole neutron generator of clause 12, wherein for each oscillation cycle of the threshold number of oscillation cycles, the processor performs the following operations to determine whether the ion beam current oscillates between the first value and the second value: set an initial value of the voltage of the reservoir control supply to a predetermined bias plus a delta; while the value of the voltage is set at the predetermined bias plus delta: periodically determine if a value of the ion beam current is greater than the first value; in response to a determination that the value of the ion beam current is not greater than the first value, maintaining the value of the voltage at the predetermined bias plus delta; and in response to a determination that the value of the ion beam current is greater than the first value, set the value of the voltage to the predetermined bias minus delta; and while the value of the voltage is set at the predetermined bias minus delta: periodically determine if the value of the ion beam current is less than the second value; in response to a determination that the value of the ion beam current is not less than the second value, maintain the value of the voltage at the predetermined bias minus delta; and in response to a determination that the value of the ion beam current is less than the second value and the ion beam current has not oscillated between the first value and the second value for the threshold number of oscillation cycles, set the value of the voltage to the predetermined bias plus delta.

Clause 14, the downhole neutron generator of clause 13, wherein in response to a determination that the value of the ion beam current is less than the second value and the ion beam current has oscillated between the first value and the second value for the threshold number of oscillation cycles, the processor is further operable to determine the proportional, integral, and derivative parameters of a proportional-integral-derivative controller.

Clause 15, the downhole neutron generator of any of clauses 10-14, wherein the processor is further operable to: configure the proportional-integral-derivative controller based on the determined proportional, integral, and derivative parameters; and utilize the configured proportional-integral-derivative controller to adjust the voltage.

Clause 16, the downhole neutron generator of any of clauses 10-15, wherein after the ion beam current having a stable oscillation cycle is flowing through the filament, the processor is further operable to: calculate a difference between a desired current value and a measured value of the ion beam current; and adjust the voltage based on the difference between the desired current value and the measured value of the ion beam current.

Clause 17, the downhole neutron generator of claim 16, wherein the processor is further operable to: determine a variable, wherein a value of the variable is equal to $$K_p * e(t) + K_i * \int_0^t e' * dt' + K_d * \frac{de(t)}{dt},$$

wherein $K_p$ is a coefficient for the proportional parameter, $K_i$ is a coefficient for the integral parameter, $K_d$ is a coefficient for the derivative parameter, and e(t) is the difference between the desired current value and a measured value of the ion beam current, and set a value of the voltage to the value of the variable to adjust the voltage based on the proportional, integral, and derivative parameters.

Clause 18, a downhole logging tool, comprising: a downhole neutron generator operable to transmit neutrons into a downhole formation to investigate the downhole formation, the downhole neutron generator comprising: a filament having a coating that releases hydrogen isotopes when the filament is heated; a reservoir control supply electrically connected to the filament and operable to supply a range of voltages to the filament to initiate neutron generation; and a processor operable to: adjust a voltage of the reservoir control supply until an ion beam current of the downhole neutron generator has a stable oscillation cycle; after the ion beam current has a stable oscillation cycle, the processor is further operable to determine proportional, integral, and derivative parameters of a proportional-integral-derivative controller that is operable to adjust an amount of power supplied to generate ions; and adjust the voltage of the reservoir control supply based on the proportional, integral, and derivative parameters.

Clause 19, the downhole logging tool of clause 18, wherein the processor is further operable to: periodically measure the ion beam current; and determine whether the ion beam current oscillates between a first value and a second value for a threshold number of oscillation cycles, wherein the ion beam current has a stable oscillation cycle if the ion beam current oscillates between a first value and a second value for the threshold number of oscillation cycles, and wherein the first value is equal to a value of a desired current plus a buffer and the second value is equal to the value of the desired current minus the buffer.

Clause 20, the downhole logging tool of clause 19, wherein for each oscillation cycle of the threshold number of oscillation cycles, the processor performs the following operations to determine whether the ion beam current oscillates between the first value and the second value: set an initial value of the voltage of the reservoir control supply to a predetermined bias plus a delta; while the value of the voltage is set at the predetermined bias plus delta: periodically determine if a value of the ion beam current is greater than the first value; in response to a determination that the value of the ion beam current is not greater than the first value, maintaining the value of the voltage at the predetermined bias plus delta; and in response to a determination that the value of the ion beam current is greater than the first value, set the value of the voltage to the predetermined bias minus delta; while the value of the voltage is set at the predetermined bias minus delta: periodically determine if the value of the ion beam current is less than the second value; in response to a determination that the value of the ion beam current is not less than the second value, maintain the value of the voltage at the predetermined bias minus delta; and in response to a determination that the value of the ion beam current is less than the second value and the ion beam current has not oscillated between the first value and the second value for the threshold number of oscillation cycles, set the value of the voltage to be the predetermined bias plus delta.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

The invention claimed is:

1. A method to auto tune a downhole neutron generator, the method comprising:
while a downhole neutron generator is deployed in a borehole of a wellbore, and while an ion beam is oscillating;
determining proportional, integral, and derivative parameters of a proportional-integral-derivative controller that is operable to adjust an amount of power supplied to generate ions; and
adjusting a voltage of a reservoir control supply of the downhole neutron generator based on the proportional, integral, and derivative parameters.

2. The method of claim 1, further comprising:
periodically measuring the ion beam current; and
determining whether an oscillation cycle of an ion beam current generated by the downhole neutron generator is stable,
wherein determining whether the ion beam current has a stable oscillation cycle further comprises determining whether the ion beam current oscillates between a first value and a second value for a threshold number of oscillation cycles.

3. The method of claim 2, wherein the first value is equal to a value of a desired current plus a buffer, and the second value is equal to the value of the desired current minus the buffer.

4. The method of claim 3, wherein for each oscillation cycle of the threshold number of oscillation cycles, determining whether the ion beam current oscillates between the first value and the second value comprises:
setting an initial value of the voltage of the downhole neutron generator to be a predetermined bias plus a delta;
while the value of the voltage is set at the predetermined bias plus delta:
periodically determining if a value of the ion beam current is greater than the first value;

in response to a determination that the value of the ion beam current is not greater than the first value, maintaining the value of the voltage at the predetermined bias plus delta; and in response to a determination that the value of the ion beam current is greater than the first value, setting the value of the voltage to be the predetermined bias minus delta; and while the value of the voltage is set at the predetermined bias minus delta:

periodically determining if the value of the ion beam current is less than the second value; and in response to a determination that the value of the ion beam current is not less than the second value, maintaining the value of the voltage at the predetermined bias minus delta; and in response to a determination that the value of the ion beam current is less than the second value and the ion beam current has not oscillated between the first value and the second value for the threshold number of oscillation cycles, setting the value of the voltage to be the predetermined bias plus delta.

5. The method of claim 4, wherein while the value of the voltage is set at the predetermined bias minus delta, the method further comprises in response to a determination that the value of the ion beam current is less than the second value and the ion beam current has oscillated between the first value and the second value for the threshold number of oscillation cycles, determining the proportional, integral, and derivative parameters of a proportional-integral-derivative controller.

6. The method of claim 1, further comprising:
configuring the proportional-integral-derivative controller based on the determined proportional, integral, and derivative parameters,
wherein adjusting the voltage comprises utilizing the configured proportional-integral-derivative controller to adjust the voltage.

7. The method of claim 1, further comprising:
determining whether an oscillation cycle of an ion beam current generated by the downhole neutron generator is stable,
wherein after determining that the oscillation cycle of the ion beam current is stable, the method further comprises:
calculating a difference between a desired current value and a measured value of the ion beam current; and
adjusting the voltage based on the difference between the desired current value and the measured value of the ion beam current.

8. The method of claim 1, wherein adjusting the voltage comprises:
determining a variable, wherein a value of the variable is equal to $$K_p * e(t) + K_i * \int_0^t e' * dt' + K_d * \frac{de(t)}{dt},$$

wherein $K_p$ is a coefficient for the proportional parameter, $K_i$ is a coefficient for the integral parameter, $K_d$ is a coefficient for the derivative parameter, and e(t) is a difference between a desired current value and a measured value of the ion beam current, and wherein adjusting the voltage comprises adjusting a value of the voltage to the value of the variable.

9. The method of claim 1, further comprising filtering out a noise component of the ion beam current.

10. A downhole neutron generator comprising:
a downhole neutron generator tube comprising:
a filament having a coating that releases hydrogen isotopes when the filament is heated;
a target foil; and
an acceleration tube for accelerating ions of the hydrogen isotopes, wherein neutrons are generated when ions of the hydrogen isotopes are accelerated through the acceleration tube, and into the target foil;
a reservoir control supply electrically connected to the filament and operable to supply a range of voltages to the filament to initiate neutron generation; and
a processor operable to:
determining whether an ion beam is oscillating; and
in response to a determination that the ion beam is oscillating:
determine proportional, integral, and derivative parameters of a proportional-integral-derivative controller that is operable to adjust an amount of power supplied to generate ions; and
adjust the voltage based on the proportional, integral, and derivative parameters.

11. The downhole neutron generator of claim 10, wherein the processor is further operable to:
periodically measure the ion beam current; and
determine whether the ion beam current oscillates between a first value and a second value for a threshold number of oscillation cycles,
wherein the ion beam current has a stable oscillation cycle if the ion beam current oscillates between a first value and a second value for the threshold number of oscillation cycles.

12. The downhole neutron generator of claim 11, wherein the first value is equal to a value of a desired current plus a buffer, and the second value is equal to the value of the desired current minus the buffer.

13. The downhole neutron generator of claim 12, wherein for each oscillation cycle of the threshold number of oscillation cycles, the processor performs the following operations to determine whether the ion beam current oscillates between the first value and the second value:
set an initial value of the voltage of the downhole neutron generator to be a predetermined bias plus a delta;
while the value of the voltage is set at the predetermined bias plus delta:
periodically determine if a value of the ion beam current is greater than the first value;
in response to a determination that the value of the ion beam current is not greater than the first value, maintaining the value of the voltage at the predetermined bias plus delta; and
in response to a determination that the value of the ion beam current is greater than the first value, set the value of the voltage to be the predetermined bias minus delta; and
while the value of the voltage is set at the predetermined bias minus delta:
periodically determine if the value of the ion beam current is less than the second value; and
in response to a determination that the value of the ion beam current is not less than the second value, maintain the value of the voltage at the predetermined bias minus delta; and
in response to a determination that the value of the ion beam current is less than the second value and the ion beam current has not oscillated between the first value and the second value for the threshold number of oscillation cycles, set the value of the voltage to be the predetermined bias plus delta.

14. The downhole neutron generator of claim 13, wherein in response to a determination that the value of the ion beam current is less than the second value and the ion beam current has oscillated between the first value and the second value for the threshold number of oscillation cycles, the processor is further operable to determine the proportional, integral, and derivative parameters of a proportional-integral-derivative controller.

15. The downhole neutron generator of claim 10, wherein the processor is further operable to:
configure the proportional-integral-derivative controller based on the determined proportional, integral, and derivative parameters; and
utilize the configured proportional-integral-derivative controller to adjust the voltage.

16. The downhole neutron generator of claim 10, wherein after the ion beam current having a stable oscillation cycle is flowing through the filament, the processor is further operable to:
calculate a difference between a desired current value and a measured value of the ion beam current; and
adjust the voltage based on the difference between the desired current value and the measured value of the ion beam current.

17. The downhole neutron generator of claim 10, wherein the processor is further operable to:
determine a variable, wherein a value of the variable is equal to $$K_p * e(t) + K_i * \int_0^t e' * dt' + K_d * \frac{de(t)}{dt},$$

wherein $K_p$ is a coefficient for the proportional parameter, $K_i$ is a coefficient for the integral parameter, $K_d$ is a coefficient for the derivative parameter, and e(t) is the difference between the desired current value and a measured value of the ion beam current, and
set a value of the voltage to the value of the variable to adjust the voltage based on the proportional, integral, and derivative parameters.

18. A downhole logging tool, comprising:
a downhole neutron generator operable to transmit neutrons into a downhole formation to investigate the downhole formation, the downhole neutron generator comprising:
a filament having a coating that releases hydrogen isotopes when the filament is heated;
a reservoir control supply electrically connected to the filament and operable to supply a range of voltages to the filament to initiate neutron generation; and a processor operable to:
determining if an ion beam is oscillating;
in response to a determination that the ion beam is oscillating:
determine proportional, integral, and derivative parameters of a proportional-integral-derivative controller that is operable to adjust an amount of power supplied to generate ions; and
adjust the voltage based on the proportional, integral, and derivative parameters.

19. The downhole logging tool of claim 18, wherein the processor is further operable to:
periodically measure the ion beam current; and
determine whether the ion beam current oscillates between a first value and a second value for a threshold number of oscillation cycles,
wherein the ion beam current has a stable oscillation cycle if the ion beam current oscillates between a first value and a second value for the threshold number of oscillation cycles, and
wherein the first value is equal to a value of a desired current plus a buffer and the second value is equal to the value of the desired current minus the buffer.

20. The downhole logging tool of claim 19, wherein for each oscillation cycle of the threshold number of oscillation cycles, the processor performs the following operations to determine whether the ion beam current oscillates between the first value and the second value:
set an initial value of the voltage of the downhole neutron generator to be a predetermined bias plus a delta;
while the value of the voltage is set at the predetermined bias plus delta:
periodically determine if a value of the ion beam current is greater than the first value;
in response to a determination that the value of the ion beam current is not greater than the first value, maintaining the value of the voltage at the predetermined bias plus delta; and
in response to a determination that the value of the ion beam current is greater than the first value, set the value of the voltage to be the predetermined bias minus delta;
while the value of the voltage is set at the predetermined bias minus delta:
periodically determine if the value of the ion beam current is less than the second value; and
in response to a determination that the value of the ion beam current is not less than the second value, maintain the value of the voltage at the predetermined bias minus delta; and
in response to a determination that the value of the ion beam current is less than the second value and the ion beam current has not oscillated between the first value and the second value for the threshold number of oscillation cycles, set the value of the voltage to be the predetermined bias plus delta.

* * * * *